United States Patent
Huttner et al.

(10) Patent No.: US 8,708,682 B2
(45) Date of Patent: Apr. 29, 2014

(54) REPAIR METHOD

(75) Inventors: Roland Huttner, Jesenwang (DE); Karl-Heinz Dusel, Unterschleissheim (DE); Erwin Bayer, Dachau (DE); Albin Platz, Ried-Baindlkirch (DE)

(73) Assignee: MTU Aero Engines GmbH, Munich (DE)

( * ) Notice: Subject to any disclaimer, the term of this patent is extended or adjusted under 35 U.S.C. 154(b) by 262 days.

(21) Appl. No.: 12/998,560

(22) PCT Filed: Nov. 5, 2009

(86) PCT No.: PCT/DE2009/001539
§ 371 (c)(1),
(2), (4) Date: May 2, 2011

(87) PCT Pub. No.: WO2010/051799
PCT Pub. Date: May 14, 2010

(65) Prior Publication Data
US 2011/0217457 A1 Sep. 8, 2011

(30) Foreign Application Priority Data
Nov. 7, 2008 (DE) .......................... 10 2008 056 336

(51) Int. Cl.
*B29C 43/02* (2006.01)
(52) U.S. Cl.
USPC ............ 425/78; 425/110; 425/117; 425/256; 419/48
(58) Field of Classification Search
USPC ............... 425/78, 344–345, 352–355, 405.1, 425/405.2, 110, 117, 256; 419/48–49, 53, 419/54, 68
See application file for complete search history.

(56) References Cited

U.S. PATENT DOCUMENTS

| | | | | |
|---|---|---|---|---|
| 4,383,809 A | * | 5/1983 | Hoffmuller | 425/78 |
| 4,883,216 A | | 11/1989 | Patsfall | 228/119 |
| 5,252,264 A | * | 10/1993 | Forderhase et al. | 264/497 |
| RE37,875 E | * | 10/2002 | Lawton | 264/401 |
| 6,682,688 B1 | * | 1/2004 | Higashi et al. | 264/497 |
| 7,047,098 B2 | * | 5/2006 | Lindemann et al. | 700/119 |
| 7,455,740 B2 | | 11/2008 | Bostamjoglo et al. | 148/525 |

(Continued)

FOREIGN PATENT DOCUMENTS

DE    39 09 733    10/1989
DE    103 19 494 A1    11/2004

(Continued)

*Primary Examiner* — Joseph S Del Sole
*Assistant Examiner* — Thukhanh Nguyen
(74) *Attorney, Agent, or Firm* — Davidson, Davidson & Kappel, LLC

(57) ABSTRACT

A method for repairing gas turbine components, in particular gas turbine blades, including at least the following steps: a) preparing a gas turbine component to be repaired; b) removing a damaged portion from the gas turbine component to be repaired, thereby forming a plane separation surface; c) placing the gas turbine component at least partly in a process chamber in such a way that the plane separation surface extends approximately horizontally within the process chamber; d) filling the process chamber with a metal powder that is bonding-compatible with the material of the gas turbine component to be repaired, namely up to the level of the separation surface; e) building up the removed portion on the separation surface by depositing metal powder in layers onto the separation surface and by fusing the metal powder, which has been deposited in layers onto the separation surface, to the separation surface.

4 Claims, 3 Drawing Sheets

(56) References Cited

U.S. PATENT DOCUMENTS

| | | |
|---|---|---|
| 7,810,237 B2 | 10/2010 | Lange et al. ............... 29/889.1 |
| 7,874,473 B2 | 1/2011 | Heinz et al. ............... 228/119 |
| 2007/0084047 A1 | 4/2007 | Lange et al. ............... 29/889.1 |
| 2008/0131539 A1 | 6/2008 | Perret et al. ............... 425/63 |
| 2009/0271985 A1 | 11/2009 | Lange ............... 29/889.1 |

FOREIGN PATENT DOCUMENTS

| | | |
|---|---|---|
| DE | 10 2006 044 555 A1 | 4/2008 |
| EP | 14 00 339 A1 | 9/2004 |
| EP | 1704989 A2 | 9/2006 |
| EP | 1 925 433 A1 | 5/2008 |
| EP | 19 67 312 A1 | 9/2008 |
| WO | WO 2004/096487 A1 | 11/2004 |
| WO | WO 2008/034413 A1 | 3/2008 |

\* cited by examiner

REPAIR METHOD

The present invention relates to a repair method for gas turbine components, in particular for gas turbine blades. Moreover, the present invention relates to a process chamber used for the repair method according to the present invention.

Gas turbine components, such as gas turbine blades of an integrally bladed gas turbine rotor, for example, are subject to wear during operation. The wear can necessitate that the gas turbine components be repaired once they are damaged, in that damaged portions of the gas turbine components are removed from the same, and replaced following removal thereof.

BACKGROUND

Thus, for example, the rotor-side moving blades of integrally bladed gas turbine rotors are subject during operation to wear, in particular caused by oxidation, corrosion, erosion, as well as due to bird impact or hailstorms, thereby necessitating removal of damaged portions thereof, and replacement of the same following removal thereof. Stator-side components, such as guide vanes or housing structures, for example, are also subject to wear that can necessitate a repair of the same.

The German Patent Application DE 39 09 733 A1 discusses a method for repairing integrally bladed gas turbine rotors, for example, which provides for removing a damaged portion of the gas turbine blade to be repaired and, following removal thereof, for replacing the same by welding on a replacement part. In this case, an inductive pressure welding is preferably used.

It is also known from practice to repair rotor blades of a gas turbine rotor, for example, in that, following its removal from the rotor blade, a damaged portion is replaced by laser powder deposition welding. However, when laser powder deposition welding is used for the repair, it is difficult to ensure an adequate contour precision.

Therefore, there is a need for a method for repairing gas turbine components that will make a repair possible while ensuring a high contour precision.

SUMMARY OF THE INVENTION

It is an object of the present invention to provide a novel method for repairing gas turbine components, in particular gas turbine blades.

The present invention provides a method for repairing gas turbine components, in particular gas turbine blades, encompasses the following steps: a) preparing a gas turbine component to be repaired; b) removing a damaged portion from the gas turbine component to be repaired, thereby forming a plane separation surface; c) placing the gas turbine component at least partly in a process chamber in such a way that the plane separation surface extends approximately horizontally within the process chamber; d) filling the process chamber with a metal powder that is bonding-compatible with the material of the gas turbine component to be repaired, namely up to the level of the separation surface; e) building up anew the removed portion on the separation surface by depositing metal powder in layers onto the separation surface and by fusing the metal powder, that has been deposited in layers onto the separation surface, to the separation surface.

The method according to the present invention makes it possible to realize a repair of gas turbine components while ensuring a high contour precision. A damaged portion, which has been removed from a gas turbine component to be repaired, may be renewed built up anew using as little over-allowance as possible. Another advantage of the method according to the present invention resides in that a high quality of the thereby forming material structure may be ensured. The method according to the present invention is automatable and, therefore, renders possible a good reproducibility. In addition, in comparison to other repair methods, the method according to the present invention makes it possible for gas turbine components to be repaired inexpensively.

A process chamber is also provided.

BRIEF DESCRIPTION OF THE DRAWINGS

Preferred embodiments of the present invention are derived from the dependent claims and from the following description. Non-limiting exemplary embodiments of the present invention are described in greater detail with reference to the drawing, whose:

DETAILED DESCRIPTION

Figure 1:
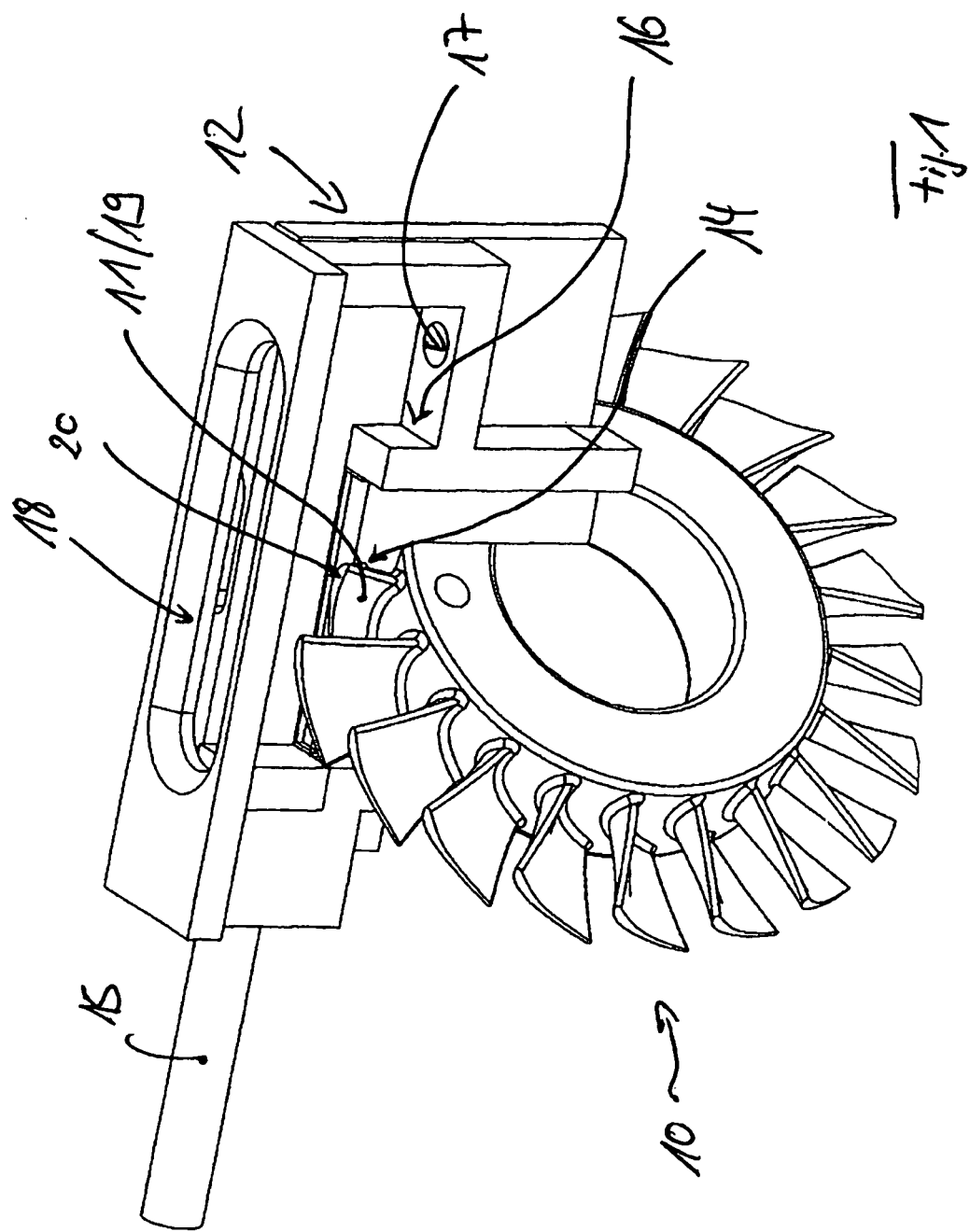
FIG. 1: is a representation for illustrating the method according to the present invention and of a process chamber according to the present invention used for repairing an integrally bladed gas turbine rotor.

The present invention relates to a method for repairing gas turbine components, in particular gas turbine blades. The method is particularly suited for repairing gas turbine blades of an integrally bladed gas turbine rotor and for repairing complex housing structures of a gas turbine.

In a first step of the method according to the present invention, a gas turbine component to be repaired is prepared. In a subsequent second step of the method according to the present, a damaged portion is removed from the gas turbine component to be repaired, forming, namely, an approximately plane separation surface.

Once the damaged portion is removed from the component to be repaired, thereby forming the plane separation surface, the gas turbine component to be repaired is positioned in a third step, at least partly, in a process chamber, namely, in such a way that the plane separation surface is oriented, respectively extends approximately horizontally.

Subsequently thereto, in a fourth step of the method according to the present invention, the process chamber is filled with metal powder, the metal powder being bonding-compatible with the material of the gas turbine component to be repaired. The process chamber is filled with the metal powder up to the level of the separation surface, thus until the edges of the separation surface are reached.

In a subsequent fifth step of the method according to the present invention, the process chamber may be evacuated or flooded with protective gas, respectively inert gas.

Following the evacuation of the process chamber, respectively flooding of the same with inert gas, in a sixth step of the method according to the present invention, the portion removed from the gas turbine component is built up anew on the separation surface, namely by depositing metal powder in layers onto the separation surface and by fusing together the metal powder, which has been deposited in layers onto the separation surface, and the separation surface.

This depositing of metal powder in layers and fusing together of the same with the separation surface take place in a plurality of steps until the removed portion has been built up anew. The fusing together of the metal powder, which has been deposited in layers, with the separation surface takes place using a thermal energy source, in particular a laser or an electron beam.

The method according to the present invention makes it possible for the removed, damaged portion to be built up anew with contour accuracy on the separation surface while using as little over-allowance as possible. A high quality of the material structure is obtained.

Once the removed portion is built up, the newly rebuilt portion may be smoothed in order to form the original contour of the repaired gas turbine component.

The repair method according to the present invention is suited, in particular, for repairing gas turbine blades, such as rotor-side moving blades or stator-side guide vanes.

The repair method according to the present invention is preferably used for repairing the moving blades of an integrally bladed gas turbine rotor. Housing structures may also be repaired using the method according to the present invention.

Figure 2:
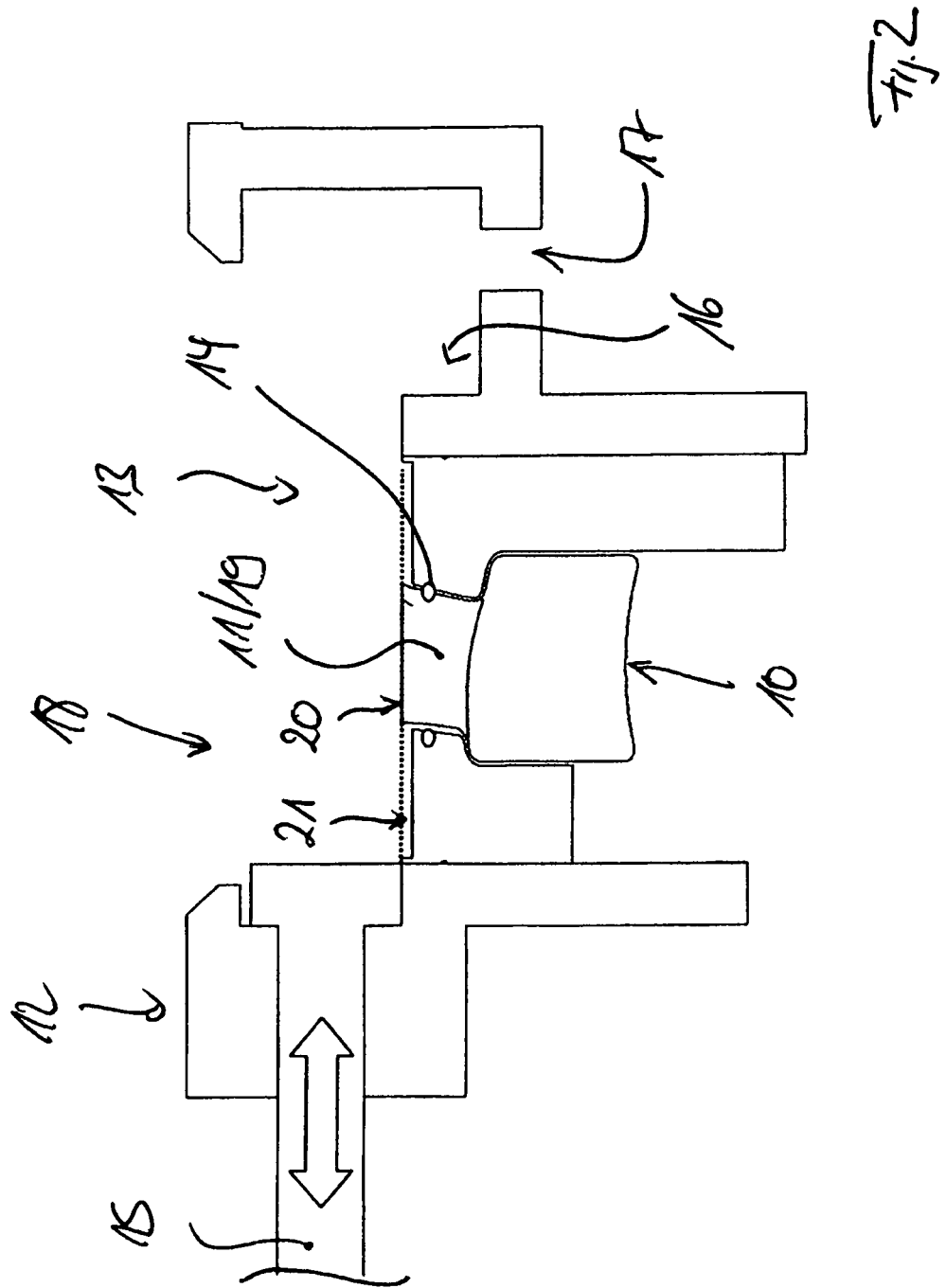
FIG. 2 is a longitudinal section through the configuration of FIG. 1.
Figure 3:
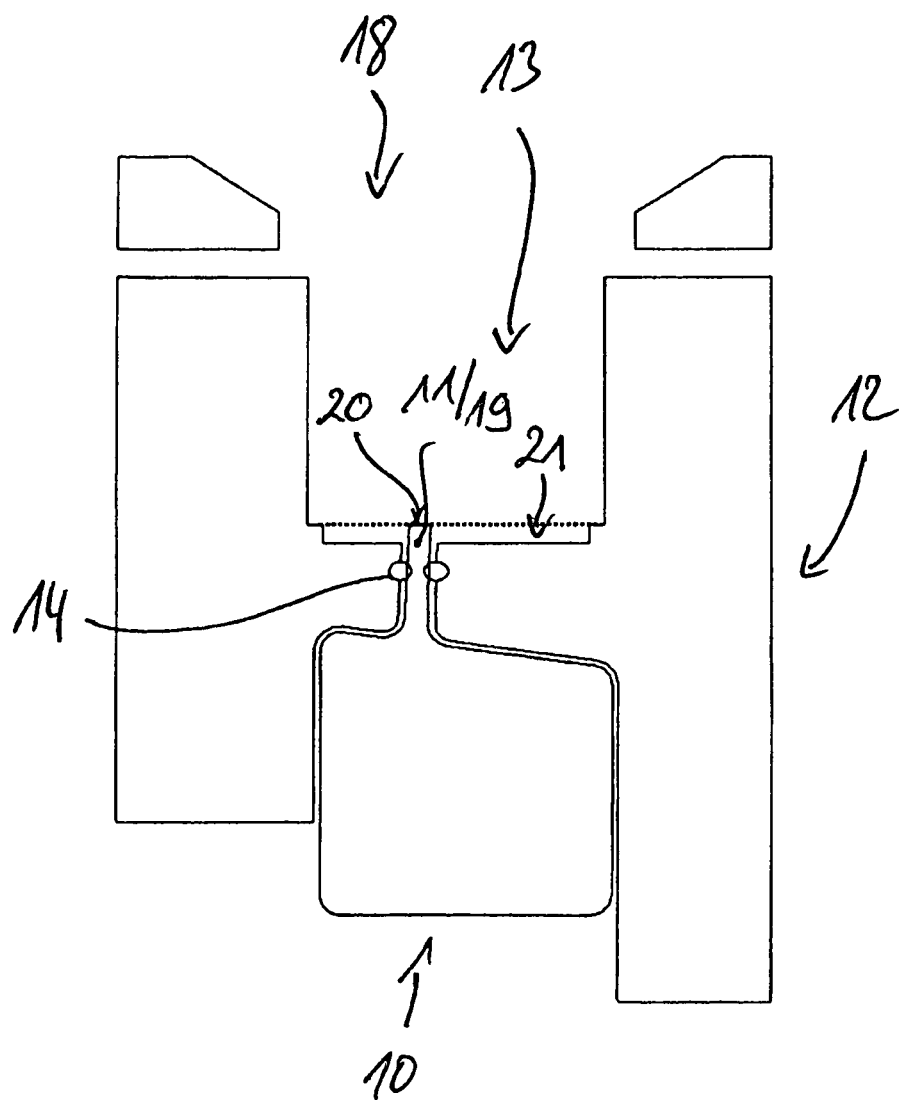
FIG. 3 is a cross section through the configuration of FIG. 1.

FIG. 1 through 3 illustrate the present invention for the preferred application case where an integrally bladed gas turbine rotor 10 is repaired in the area of a blade 11. Once a damaged portion is removed from blade 11, as may be inferred from FIGS. 2 and 3, in particular, a binding portion 19 of moving blade 11 is placed in a process chamber 12, binding portion 19 of moving blade 11 being introduced via an infeed opening of process chamber 12 in such a way into a receiving space 13 of process chamber 12 that a separation surface 20 of moving blade 11 extends horizontally within process chamber 12, respectively within receiving space 13 of the same.

In accordance with FIGS. 2 and 3, a sealing device 14 is assigned to the infeed opening of process chamber 12 in order to seal binding portion 19 of blade 11 that is introduced via the infeed opening of process chamber 12 into receiving space 13 of the same, from the infeed opening.

To renew damaged blade 11, metal powder is introducible via a filling opening 18 of process chamber 12 into the same and is positionable on separation surface 20 of blade 11, a translationally movable slide 15 of process chamber 12 making it possible to even out the metal powder deposited on separation surface 20 of blade 11. Alternatively, by moving the process chamber or by reducing the volume, the powder contained in the process chamber may be used for the layer deposition.

By sliding slide 15 in the direction of the double arrow indicated in FIG. 2, excess metal powder deposited on separation surface 20 of blade 11 may be pushed off of separation surface 20. Slide 15 makes it possible to provide a precisely defined layer of metal powder on separation surface 20 and, in fact, before the metal powder is fused together with the material of blade 11 to be repaired.

With the aid of slide 15, excess metal powder, that has been pushed off of separation surface 20 of blade 11, may be collected in an overflow region 16 of process chamber 12 and removed from overflow region 16 via a recess 17 assigned thereto.

Using process chamber 12 according to the present invention illustrated in FIG. 1 through 3, it is especially preferred that the method according to the present invention be carried out for repairing integrally bladed gas turbine rotors. Process chamber 12 features a small, compact design, making it possible for a damaged blade of an integrally bladed gas turbine rotor to be selectively and reliably repaired. The preferably elastic sealing device 14 makes it possible to seal binding portion 19 of blade 11 that has been introduced into process chamber 12.

Slide 15 is used for evening out the metal powder deposited on separation surface 20 of binding portion 19 of blade 11 and also for evening out a surface of a powder bed 21 positioned in receiving space 13. Using process chamber 12, a portion that has been removed from damaged blade 11 may be renewed in layers, to this end, process chamber 12 being displaceable within the μm-range relative to blade 11. Piezoelectric actuators provide one option for implementing this relative motion between process chamber 12 and blade 11.

Not shown in FIG. 1 through 3 are a dosing device, with whose aid the metal powder may be introduced via filling opening 18 into receiving space 13 of process chamber 12, as well as a radiation source, which is used for fusing together the metal powder and the material of blade 11 to be repaired.

As already mentioned, process chamber 12 according to the present invention makes it possible to selectively renew a blade 11 of an integrally bladed gas turbine rotor 10, in particular. To this end, it is not necessary that the entire integrally bladed gas turbine rotor 10 be positioned in a process chamber, rather only that the damaged blade 11, which is to be renewed, be placed in process chamber 12. A local powder bed for selectively renewing blade 11 of an integrally bladed gas turbine rotor 10 is hereby provided. In this context, interfering contours, such as adjacent blades projecting in opposition to separation surface 20 of damaged blade 11, do not hinder the repair of damaged blade 11.

Following the deposition of a defined powder layer onto separation surface 20 of blade 11, and following the fusing together of this powder layer and blade 11, separation surface 20 is realigned within process chamber 12 in response to a relative movement between process chamber 12 and gas turbine rotor 10, new metal powder being subsequently introduced into the process chamber via infeed opening 18 thereof in order to renew the powder layer on separation surface 20 of blade 11. Slide 15 again evens out the metal powder that is deposited on separation surface 20 of blade 11 to be repaired, in order to then build up a new layer on the binding region of blade 11. This relative motion, as well as the building up in layers of blade 11 to be repaired are carried out within the μm range.

What is claimed is:

1. A process chamber for repairing a gas turbine component, which, following removal of a damaged portion, has a binding portion having a plane separation surface, the removed portion being built up anew by the deposition in layers of metal powder onto the separation surface and by the fusing together of the metal powder and the separation surface, the process chamber comprising:
a receiving space;
an infeed opening connected to the receiving space, the infeed opening configured and arranged to introduce into the receiving space a first portion of the binding portion, the first portion having the separation surface, a second portion of the binding portion remaining in the infeed opening;
a sealing device located in the infeed opening, sealing a seal between the second portion of the binding portion and the infeed opening; and
a movable slide projecting into the receiving space and movable in parallel to the separation surface to even out metal powder deposited on the separation surface and provide a defined, uniform metal powder layer on the separation surface prior to the fusing together of the metal powder with the material of the gas turbine component to be repaired.

2. The process chamber as recited in claim 1 wherein the movable slide is displaceable relative to the gas turbine component to be repaired.

3. The process chamber as recited in claim 1 further comprising a filling opening for the metal powder to be deposited onto the separation surface.

4. The process chamber as recited in claim 1 further comprising an overflow region for excess metal powder deposited on the separation surface and pushed off of the separation surface by the slide.

* * * * *